(12) United States Patent  
Janjic et al.

(10) Patent No.: US 11,210,794 B2  
(45) Date of Patent: Dec. 28, 2021

(54) MOVING OBJECT DETECTION SYSTEM

(71) Applicant: Aurora Flight Sciences Corporation, a subsidiary of The Boeing Company, Manassas, VA (US)

(72) Inventors: Igor Janjic, Malden, MA (US); Douglas Famularo, San Francisco, CA (US)

(73) Assignee: Aurora Flight Sciences Corporation, a subsidiary of The Boeing Company, Manassas, VA (US)

( * ) Notice: Subject to any disclaimer, the term of this patent is extended or adjusted under 35 U.S.C. 154(b) by 90 days.

(21) Appl. No.: 16/825,672

(22) Filed: Mar. 20, 2020

(65) Prior Publication Data

US 2021/0295530 A1   Sep. 23, 2021

(51) Int. Cl.
*G06T 7/20* (2017.01)
*G06T 7/00* (2017.01)
*G06T 7/70* (2017.01)

(52) U.S. Cl.
CPC ............. *G06T 7/20* (2013.01); *G06T 7/70* (2017.01); *G06T 7/97* (2017.01); *G06T 2207/10016* (2013.01); *G06T 2207/10021* (2013.01); *G06T 2207/20081* (2013.01); *G06T 2207/20084* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 2017/0008521 A1* | 1/2017 | Braunstein | G08G 1/096725 |
| 2018/0114325 A1* | 4/2018 | Sanders | G06T 5/40 |
| 2021/0150279 A1* | 5/2021 | Dudzik | G06T 3/0093 |

OTHER PUBLICATIONS

Cipolla et al., "Stereoscopic Tracking of Bodies in Motion," Proceedings of the Alvey Vision Conference, 1989, pp. 109-114.

* cited by examiner

*Primary Examiner* — Vikkram Bali
(74) *Attorney, Agent, or Firm* — Yee & Associates, P.C.

(57) ABSTRACT

A method, apparatus, system for tracking an object, the method. A region of interest in an image pair is determined based on a bounding box determined for the object in the image pair. A mask based on the region of interest is applied to the image pair. The mask masks out portions of the image pair outside of the region of interest to form masked images. Intensity averaging is performed on the masked images to detect a set of pixels having a greatest intensity in the masked images. The set of pixels in the masked images is a set of common pixels in the masked images in which the set of common pixels is assumed to have a same location in both of the masked images. A three-dimensional position of the object is determined using the set of common pixels.

25 Claims, 9 Drawing Sheets

MOVING OBJECT DETECTION SYSTEM

BACKGROUND INFORMATION

1. Field

The present disclosure relates generally to an improved sensor system and, in particular, to tracking moving objects with a sensor system. Still more particularly, the present disclosure provides a method, apparatus, and system for tracking moving micro aerial vehicles that are illuminated.

2. Background

The movement of objects can be tracked in a sequence of images over time. Image analysis techniques can be employed to detect motion of an object in the sequence of images.

Further, the movement of objects through space can also be tracked using images. For example, stereoscopic tracking of objects can be performed to identify a location of the objects in three-dimensional space. Current techniques, however, may be unable to provide a desired level of accuracy in tracking the objects in real-time.

Therefore, it would be desirable to nave a method and apparatus that take into account at least some of the issues discussed above, as well as other possible issues. For example, it would be desirable to have a method and apparatus that overcome a technical problem with tracking objects with a desired level accuracy as quickly as desired to track an object in real-time.

SUMMARY

An embodiment of the present disclosure provides a method for tracking an object, the method. A region of interest in an image pair is determined based on a bounding box determined for the object in the image pair. A mask based on the region of interest is applied to the image pair. The mask masks out portions of the image pair outside of the region of interest to form masked images. Intensity averaging is performed on the masked images to detect a set of pixels having a greatest intensity in the masked images. The set of pixels in the masked images is a set of common pixels in the masked images in which the set of common pixels is assumed to have a same location in both of the masked images. A three-dimensional position of the object is determined using the set of common pixels.

Another embodiment of the present disclosure provides an object tracking system comprising a computer system and an object tracker in the computer system. The object tracker is configured to determine a region of interest in an image pair based on a bounding box determined for the object in the image pair. The object tracker is configured to apply a mask based on the region of interest to the image pair. The mask masks out portions of the image pair outside of the region of interest to form masked images. The object tracker is configured to perform intensity averaging on the masked images to detect a set of pixels having a greatest intensity in the masked images. The set of pixels in the masked images is a set of common pixels in the masked images in which the set of common pixels is assumed to have a same location in both of the masked images. The object tracker is configured to determine a three-dimensional position of the object using the set of common pixels.

Yet another embodiment of the present disclosure provides a computer program product for tracking an object. The computer program product comprises a computer-readable storage media and first program code, second program code, third program code, and fourth program code stored on the computer-readable storage media. The first program code is executable by a computer system to cause the computer system to determine a region of interest in stereoscopic images based on a bounding box determined for the object in the stereoscopic images. The second program code is executable by a computer system to cause the computer system to apply a mask based on the region of interest to the stereoscopic images, wherein the mask masks out portions of the stereoscopic images outside of the region of interest to form masked images. The third program code is executable by a computer system to cause the computer system to perform intensity averaging on the masked images to detect a set of pixels having a greatest intensity in the masked images, wherein the set of pixels in the masked images is a set of common pixels in the masked images in which the set of common pixels is assumed to have a same location in both of the masked images. The fourth program code is executable by a computer system to cause the computer system to determine a three-dimensional position of the object using the set of common pixels.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
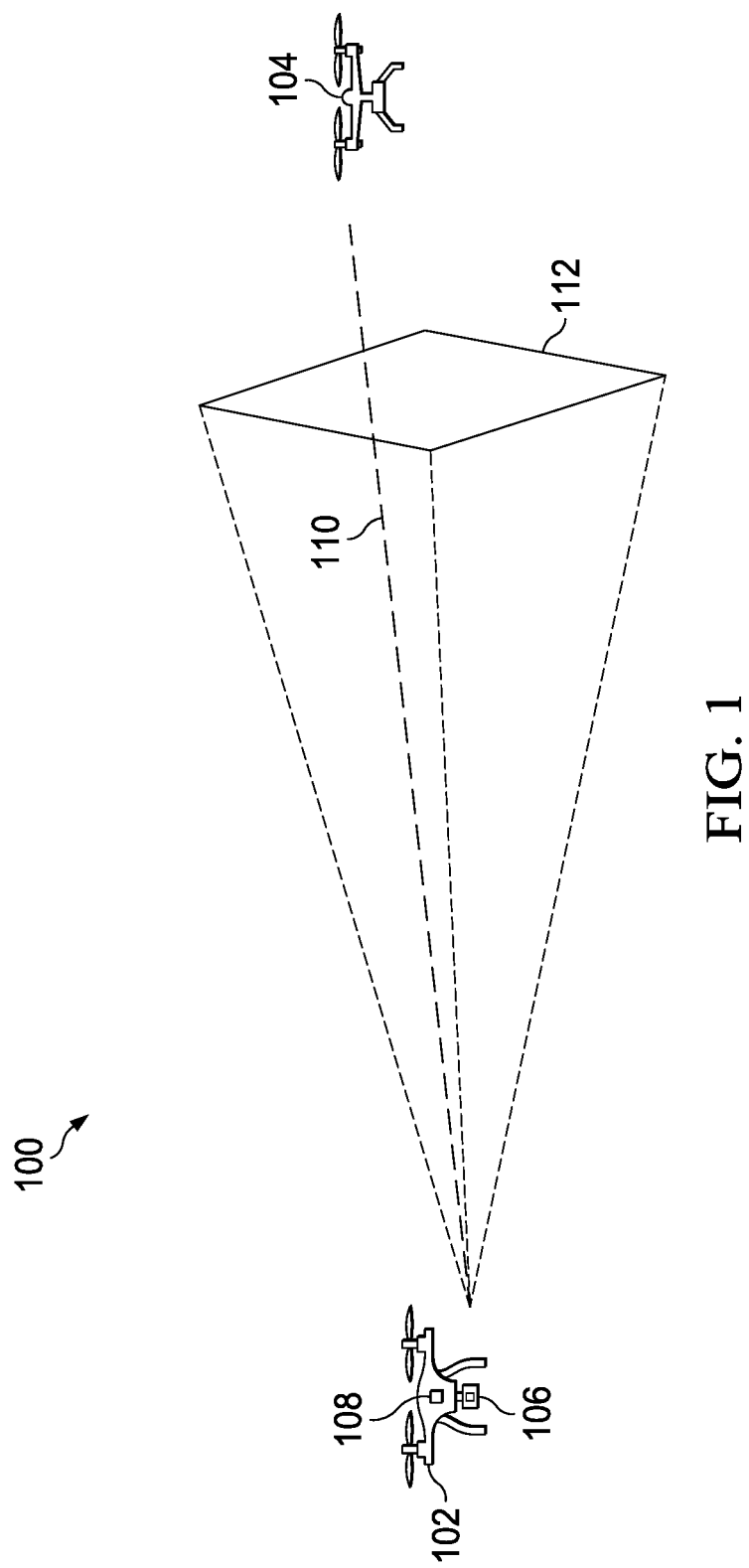
FIG. 1 is a pictorial illustration of a tracking environment in accordance with an illustrative embodiment.

The illustrative embodiments recognize and take into account one or more different considerations. For example, the illustrative embodiments recognize and take into account that a platform such as a micro aerial vehicle can carry a stereoscopic imaging system. The images generated from this imaging system can be analyzed to track movement of an object such as another micro aerial vehicle.

The illustrative embodiments recognize and take into account that one manner in which a micro aerial vehicle can be tracked is through the use of an artificial intelligence system comprising artificial neural networks. For example, the illustrative embodiments recognize and take into account that a convolutional neural network (CNN) is a deep machine learning model in an artificial intelligence system that can be trained to detect features of an object to locate the object in an image. The illustrative embodiments also recognize and take into account that the movement of an object over time in the images can be tracked using a recurrent neural network (RNN) in the artificial intelligence system.

The illustrative embodiments recognize and take into account that visual features generated by a convolution neural network can be passed to a recurrent neural network for tracking the features. The illustrative embodiments recognize and take into account that this technique may use more processing resources than desired or available in a platform such as a micro aerial vehicle. Further, the illustrative embodiments recognize and take into account that the time needed to process images may be greater than desired using a convolutional neural network and a recurrent neural network to track objects.

Thus, the illustrative embodiments provide a method, apparatus, system, and computer program product for tracking objects. In an illustrative example, an object tracker in the computer system can be configured to perform operations to track an object. An object tracker can determine a region of interest in an image pair based on a bounding box determined for the object in the image pair and apply a mask based on the region of interest to the image pair, wherein the mask masks out portions of the image pair outside of the region of interest to form masked images. The object tracker can perform intensity averaging on the masked images to detect a set of pixels having a greatest intensity in the masked images, wherein the set of pixels in the masked images are a set of common pixels in the masked images in which the set of common pixels is assumed to have a same location in both of the masked images. The object tracker can determine a three-dimensional position of the object using the set of common pixels.

As used herein, a "set of," when used with reference to items, means one or more items. For example, a "set of pixels" is one or more pixels.

The object tracker can receive subsequent images in determined subsequent regions of interest based on prior regions of interest. In the illustrative example, determining a bounding box from detecting the object in the image is optional for the subsequent images. As a result, the time of processing resources needed for detecting an object in generating a bounding box can be reduced or avoided in the illustrative example.

With reference now to the figures and, in particular, with reference to FIG. 1, a pictorial illustration of a tracking environment is depicted in accordance with an illustrative embodiment. In this illustrative example, tracking environment 100 is an environment in which micro aerial vehicle (MAV) 102 tracks target micro aerial vehicle 104. In other implementations of tracking environment 100, other types of objects can be tracked in addition to or in place of target micro aerial vehicle 104, and other platforms can be used to perform tracking in addition to or in place of micro aerial vehicle 102.

As depicted in this illustrative, non-limiting example, micro aerial vehicle 102 carries intelligence surveillance and reconnaissance (ISR) payload 106. This payload comprises sensors that can be used to generate data for tracking target micro aerial vehicle 104.

In this particular example, ISR payload 106 includes a stereoscopic camera system and a laser system. The stereoscopic camera system can generate stereoscopic graphic images. The laser system can be used to illuminate targets such as target micro aerial vehicle 104.

In the illustrative example, object tracker 108 is located in a data processing system in micro aerial vehicle 102 and tracks target micro aerial vehicle 104 using data generated by ISR payload 106.

As depicted, the stereoscopic camera system in ISR payload 106 generates images pairs. An image pair is a pair of images such as two stereoscopic images. Each image in the image pair is created by one of two cameras that are offset from each other in the stereoscopic camera system and may have a relative rotation.

In this illustrative example, the laser system in ISR payload 106 illuminates target micro aerial vehicle 104 with laser beam 110 as the stereoscopic camera system generates stereoscopic images within field of view 112 of the stereoscopic camera system in ISR payload 106. Laser beam 110 is an example of a light source/focused light. The type of light may be selected from any light spectrum band, including visible, infrared, and ultraviolet. The illumination is a wavelength or range or wavelengths that can be detected by the stereoscopic camera system and does not need to be visible to a human eye. In this illustrative example, field of view 112 is the extent of tracking environment 100 that can be captured in an image at any given moment.

In this illustrative example, object tracker 108 detects target micro aerial vehicle 104 within the stereoscopic images and determines a bounding box for target micro aerial vehicle 104 in these two stereoscopic images.

Based on the bounding box, object tracker 108 also determines a region of interest and applies a mask based on the region of interest to the stereoscopic images to form masked images. Object tracker 108 identifies one or more common pixels between the masked images. The common pixels are used to determine a three-dimensional position of target micro aerial vehicle 104.

Further, object tracker 108 can predict a subsequent three-dimensional position of target micro aerial vehicle 104 using the three-dimensional position of target micro aerial vehicle 104 and prior three-dimensional positions of target micro aerial vehicle 104. A path for target micro aerial vehicle 104 can also be determined by object tracker 108.

When subsequent image pairs comprising subsequent pairs of images are received, the region of interest can be determined without needing to perform object detection on the stereoscopic images and create a bounding box. With the subsequent image pairs, object tracker 108 can determine the new region of interest based on the prior region of interest and a predicted subsequent three-dimensional position of target micro aerial vehicle 104. As a result, time and processing resources needed to perform detection and generate a bounding box can be omitted with subsequent image pairs.

The process for detecting target micro aerial vehicle 104 by generating a bounding box in a subsequent image pair may be performed if common pixels cannot be identified for target micro aerial vehicle 104 in the region of interest for the subsequent image pair. The detection by generating the bounding box in a subsequent image pair can also be performed to validate that the common pixels identified do belong to target micro aerial vehicle 104.

With the ability to track target micro aerial vehicle 104, a number of different actions can be performed. For example, by nailing the position and subsequent three-dimensional positions of target micro aerial vehicle 104, object tracker 108 can operate ISR payload 106 to continue to direct laser beam 110 at target micro aerial vehicle 104 to illuminate target micro aerial vehicle 104.

As another example, micro aerial vehicle 102 and target micro aerial vehicle 104 can be a part of a swarm of micro aerial vehicles flying coordinated maneuvers such as in a tight formation and capable of changing formation shapes for an artistic display or light show. With the ability to determine positions and track movement, tighter and more precise formations can be achieved by coordinated flying of micro aerial vehicle 102 and target micro aerial vehicle 104. Additionally, collision avoidance can be informed using this information as well as other actions. For example, determined position of target micro aerial vehicle 104 can be used by a flight control system in the micro aerial vehicle 102 to change the flight path of micro aerial vehicle 102.

The illustration of tracking environment 100 in FIG. 1 is provided as an example of one implementation in which tracking can be performed in accordance with an illustrative embodiment. This illustration is not meant to limit the manner in which other examples can be implemented. For example, one or more micro aerial vehicles can be present in addition to micro aerial vehicle 102 and target micro aerial vehicle 104. These additional micro aerial vehicles can be tracked by micro aerial vehicle 102. Alternatively, the other micro aerial vehicles can also track target micro aerial vehicle 104 when flying as a swarm to perform coordinated maneuvers.

Figure 2:
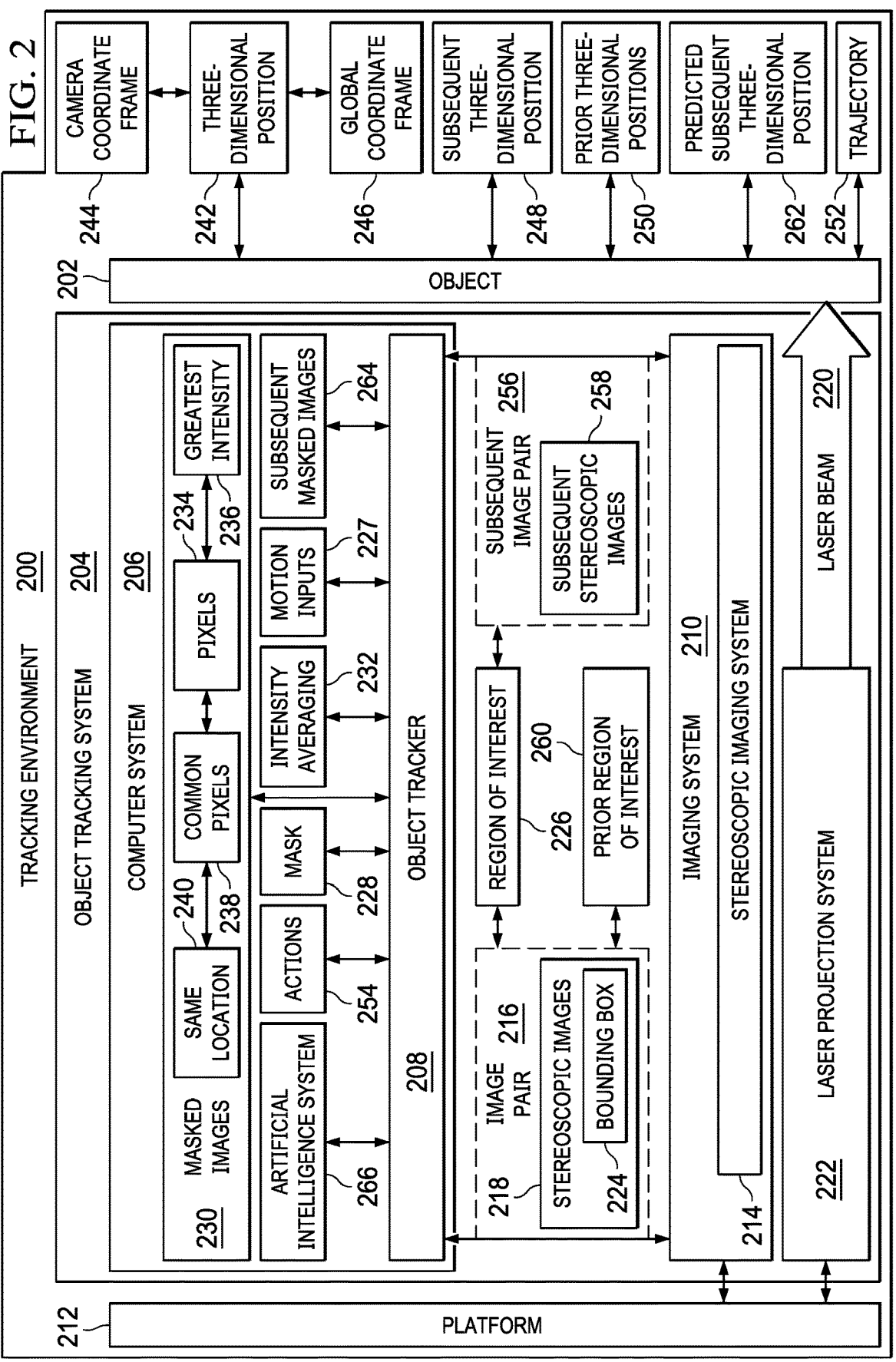
FIG. 2 is an illustration of a block diagram of a tracking environment in accordance with an illustrative embodiment.

With reference now to FIG. 2, an illustration of a block diagram of a tracking environment is depicted in accordance with an illustrative embodiment. Tracking environment 100 in FIG. 1 is an example of one implementation for tracking environment 200.

In this illustrative example, object 202 is a physical real-world object that can be tracked by object tracking system 204. Object 202 can take a number of different forms. For example, object 202 can be one of a moving object, a stationary object, an aerial vehicle, an aircraft, an airplane, a rotorcraft, an unmanned aerial vehicle, a micro aerial vehicle such as target micro aerial vehicle 104 in FIG. 1, a missile, a rocket, a spacecraft, a ground vehicle, an unmanned ground vehicle, a train, a surface ship, a bus, a semi-trailer truck, a high mobility multipurpose wheeled vehicle, and other types of objects.

In this illustrative example, object tracking system 204 comprises computer system 206, object tracker 208, and imaging system 210. Object tracker 208 is located in computer system 206.

As depicted, object tracking system 204 is connected to platform 212. Platform 212 can take a number of different forms. For example, platform 212 can be one of an aircraft, an airplane, a rotorcraft, an unmanned aerial vehicle, a micro aerial vehicle, a ship, a train, a missile, a rocket, a spacecraft, a satellite, a stationary platform, a moving platform, an aquatic platform, a space platform a building, and other suitable types of platforms.

When one component is "connected" to another component, the connection is a physical association. For example, a first component can be considered to be physically connected to a second component by at least one of being secured to the second component, bonded to the second component, mounted to the second component, welded to the second component, fastened to the second component, or connected to the second component in some other suitable manner. The first component can also be connected to the second component using a third component. The first component can also be considered to be physically connected to the second component by being formed as part of the second component, an extension of the second component, or both.

In this illustrative example, object tracker 208 can be implemented in software, hardware, firmware, or a combination thereof. When software is used, the operations performed by object tracker 208 can be implemented in program code configured to run on hardware, such as a processor unit. When firmware is used, the operations performed by object tracker 208 can be implemented in program code and data and stored in persistent memory to run on a processor unit. When hardware is employed, the hardware can include circuits that operate to perform the operations in object tracker 208.

In the illustrative examples, the hardware can take a form selected from at least one of a circuit will do system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 206 is a physical hardware system and includes one or more data processing systems. When more than one data processing system is present in computer system 206, those data processing systems are in communication with each other using a communications medium. The communications medium can be a network. The data processing systems can be selected from at least one of a computer, a server computer, a tablet computer, or some other suitable data processing system.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, imaging system 210 is a hardware system in communication with object tracker 208. Imaging system 210 can be stereoscopic imaging system 214. In the illustrative example, stereoscopic imaging system 214 comprises at least two cameras. The two cameras are offset from each other and generate the images in image pair 216 of object 202. In this example, imaging system 210 may contain lenses tuned to the specific wavelength of light emitted by laser projection system 222.

Image pair 216 comprises stereoscopic images 218 generated by two cameras in stereoscopic imaging system 214. As depicted, stereoscopic images 218 are two images.

As depicted, object tracker 208 is configured to perform a number of different operations in tracking object 202. Object tracker 208 receives image pair 216 of object 202 illuminated by laser beam 220 in this illustrative example.

In the illustrative example, laser beam 220 is generated by laser projection system 222. In this illustrative example, laser projection system 222 is a physical hardware system and can include software. Laser project system 222 includes one or more laser generators that operate to emit laser beam 220. A laser generator can comprise a mirror system, a group of laser diodes, and a mirror controller. The group of laser diodes can be directed at the micro electromechanical systems mirror. The mirror controller can move the mirror system such that a group of laser diodes emit lasers beam 220 to illuminate object 202.

The mirror system can comprise a number of different types of mirrors. For example, the mirror system can include at least one of a micro electromechanical system mirror, a polygonal scanning mirror, or other suitable types of mirrors. One or more of these types of mirrors can be used to direct laser beam 222 to illuminate object 202.

In this illustrative example, image pair 216 comprises stereoscopic images 218 generated by stereoscopic imaging system 214. Object tracker 208 determines bounding box 224 for object 202 in stereoscopic images 218.

As depicted, object tracker 208 determines region of interest 226 in stereoscopic images 218 based on bounding box 224 for object 202 in stereoscopic images 218. In the illustrative example, region of interest 226 be determined by also using motion inputs 227. Motion inputs 227 can take a number of different forms. For example, motion inputs 227 can be at least one of a motion of platform 212, a predicted movement of object 202, global positioning system data for platform 212, altitude data for platform 212, movement characteristics of platform 212, and other suitable information. Movement characteristics can include limitations on the movement of platform 212. For example, a bank radius, a turn angle, or other movement characteristic of an aircraft can be a motion input when platform 212 is an aircraft.

Region of interest 226 is a portion of stereoscopic images 218. In this illustrative example, region of interest 226 is the portion of stereoscopic images 218 that is of interest for further analysis.

In this illustrative example, region of interest 226 can be selected to include bounding box 224, be located in bounding box 224, overlap a portion of bounding box 224, or be selected to have some other relationship with respect to bounding box 224. When region of interest 226 includes bounding box 224, region of interest 226 can have a same size and position as bounding box 224.

As depicted, object tracker 208 applies mask 228 based on region of interest 226 to stereoscopic images 218. In this illustrative example, mask 228 masks out portions of stereoscopic images 218 outside of region of interest 226 to form masked images 230. In other words, mask 228 can function as a filter to only pass pixels within region of interest 226. The other portions can be all black, white, or some other suitable uniform color.

In the illustrative example, object tracker 208 can perform intensity averaging 232 on masked images 230 to detect a set of pixels 234 having greatest intensity 236 in masked images 230. Intensity averaging 232 can take a number of different forms. For example, intensity averaging 232 can be selected from at least one of a weighted intensity averaging, a maximum pixel value, a sliding window average, or other intensity averaging techniques. For example, intensity averaging 232 can be performed to find a weighted average intensity instead of a maximum intensity. For example, weighted average intensities can be identified for both images.

In other illustrative examples, intensity averaging 232 can be performed in a manner to improve detection accuracy instead of finding the maximum intensity pixel. Processes that have a rate that is sufficient to process images in real time.

In illustrative examples, intensity averaging 232 can be performed on different types of images. For example, intensity averaging 232 can be performed on at least one of a grayscale image or color image.

In this illustrative example, intensity averaging 232 can be performed when laser beam 220 illuminates object 202 when image pair 216 is generated by imaging system 210. The use of laser beam 222 to illuminate object 202 can increase the likelihood that the set of maximum pixel values are located on object 202.

The set of pixels 234 in masked images 230 are a set of common pixels 238 in masked images 230 in which the set of common pixels 238 is assumed to have same location 240 in both of masked images 230. The set of common pixels 238 is one or more common pixels between masked images 230. In the illustrative example, same location 240 is the same location on object 202. For example, same location 240 can be pixels representing a feature on object 202. The feature can be, for example, a wheel, a fairing, a bolt, or some other suitable feature of object 202 that is present in masked images 230. Object tracker 208 determines three-dimensional position 242 of object 202 using the set of common pixels 238.

In the illustrative example, three-dimensional position 242 can be a location of object 202 in a three-dimensional space and can include an orientation of the object 202. Three-dimensional position 242 can be described using three-dimensional coordinates for a three-dimensional coordinate system. The three-dimensional coordinate system can be, for example, a Cartesian coordinate system, a spherical coordinate system, or some other suitable type of coordinate system that can describe locations in a three-dimensional space.

Further, three-dimensional position 242 can also include an orientation of object 202. In other words, this position can also include a direction in which object 202 is pointing.

Three-dimensional position 242 determined by object tracker 208 can be initially a position in camera coordinate frame 244. Three-dimensional position 242 can be determined by performing triangulation on the set of common pixels 238 in masked images 230. In this illustrative example, the triangulation can be performed using the positions of the two cameras in stereoscopic imaging system 214 and the set of common pixels 238.

Object tracker 208 can convert the position of object 202 from camera coordinate frame 244 to global coordinate frame 246 to obtain three-dimensional position 242 of object 202. In other illustrative examples, the conversion can be to other coordinate frames other than global coordinate frame 246. Another coordinate frame can be an inertial local coordinate frame with the center of gravity of the platform 212 being the origin of the coordinate frame.

In the illustrative example, a coordinate frame is a coordinate system for a frame of reference. For example, camera coordinate frame 244 describes the position of objects using imaging system 210 as the frame of reference.

With three-dimensional position 242, object tracker 208 can also predict subsequent three-dimensional position 248 of object 202 using three-dimensional position 242 of object 202 and a set of prior three-dimensional positions 250 of object 202. Further, object tracker 208 can predict subsequent three-dimensional position 248 and trajectory 252 of object 202 using three-dimensional position 242 of object 202 and the set of prior three-dimensional positions 250 of object 202. In the illustrative example, trajectory 252 is a path for movement of object 202. The path is one that object 202 follows through space as a function of time.

Subsequent three-dimensional position 248 of object 202 can be predicted in a number of different ways. For example, the prediction can be performed by using at least one of a Kalman filter, a particle filter, two-dimensional interpolation, linear interpolation, or some other suitable known process for predicting subsequent three-dimensional positions of an object.

In this illustrative example, object tracker 208 can perform a set of actions 254 with predicting subsequent three-dimensional position 248 of object 202. For example, object tracker 208 can direct laser beam 220 to illuminate object 202 using a predicted subsequent three-dimensional position of object 202. The set of actions 254 can also include at least one of target following, collision avoidance, coordinated movement with object 202, target intercept, target capture, other target engagements, or other suitable actions.

Object tracker 208 can continue to receive image pairs from imaging system 210. For example, object tracker 208 can receive subsequent image pair 256. In this example, subsequent image pair 256 comprises subsequent stereoscopic images 258 generated by stereoscopic imaging system 214.

As depicted, object tracker 208 can determine region of interest 226 in subsequent stereoscopic images 258 based on prior region of interest 260 and predicted subsequent three-dimensional position 262 of object 202 in subsequent stereoscopic images 258.

Object tracker 208 can apply mask 228 based on region of interest 226 to subsequent stereoscopic images 258. As depicted, mask 228 masks out the portions of subsequent stereoscopic images 258 outside of region of interest 226 to form subsequent masked images 264.

In this illustrative example, object tracker 208 can perform intensity averaging 232 on subsequent masked images 264 to detect the set of pixels 234 having greatest intensity 236 in subsequent masked images 264. The set of pixels 234 in subsequent masked images 264 are the set of common pixels 238 in subsequent masked images 264 that are assumed to have same location 240. Object tracker 208 can determine three-dimensional position 242 of object 202 using the set of common pixels 238 identified in subsequent masked images 264. As a result, object tracker 208 can continue to detect the current position of object 202 as additional image pairs are received from imaging system 210.

In this illustrative example, object tracker 208 can perform one or more operations using artificial intelligence system 266. As depicted, artificial intelligence system 266 is a system that has intelligent behavior and can be based on the function of a human brain. An artificial intelligence system comprises at least one of an artificial neural network, a deep neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

Artificial intelligence system 266 can include machine learning models implemented using one or more architectures such as a deep neural network or other suitable architectures. A machine learning model is a type of artificial intelligence model that can learn without being explicitly programmed.

A machine learning model can learn based on data input into the machine learning model. The machine learning model can learn using various types of machine learning algorithms. The machine learning algorithms include at least one of a supervised learning, an unsupervised learning, a feature learning, a sparse dictionary learning, an anomaly detection, association rules, or other types of learning algorithms. Examples of machine learning models include an artificial neural network, a decision tree, a support vector machine, a Bayesian network, a genetic algorithm, and other types of models. These machine learning models can be trained using data and process additional data to provide a desired output. The machine learning models can be pre-trained with a representative collected dataset or trained in an online fashion using new input data.

In one illustrative example, one or more technical solutions are present that overcome a technical problem with tracking objects with a desired level of accuracy and as quickly as desired to track an object in real-time. As a result, one or more technical solutions can provide a technical effect of increasing the speed at which an object can be tracked using stereoscopic images. Further, in one or more illustrative examples, a technical solution is present in which false positives from triangulation is reduced. Further, the one or more illustrative examples provide a technical solution in which triangulation can be performed at a rate that provides for real-time tracking of objects.

Computer system 206 can be configured to perform at least one of the steps, operations, or actions described in the different illustrative examples using software, hardware, firmware, or a combination thereof. As a result, computer system 206 operates as a special purpose computer system in which object tracker 208 in computer system 206 enables tracking an object using stereoscopic images in a manner that reduces a use of computer resources in detecting the object in the image and generates a bounding box. In particular, object tracker 208 in computer system 206 transforms computer system 206 into a special purpose computer system as compared to currently available general computer systems that do not have object tracker 208.

Figure 3:
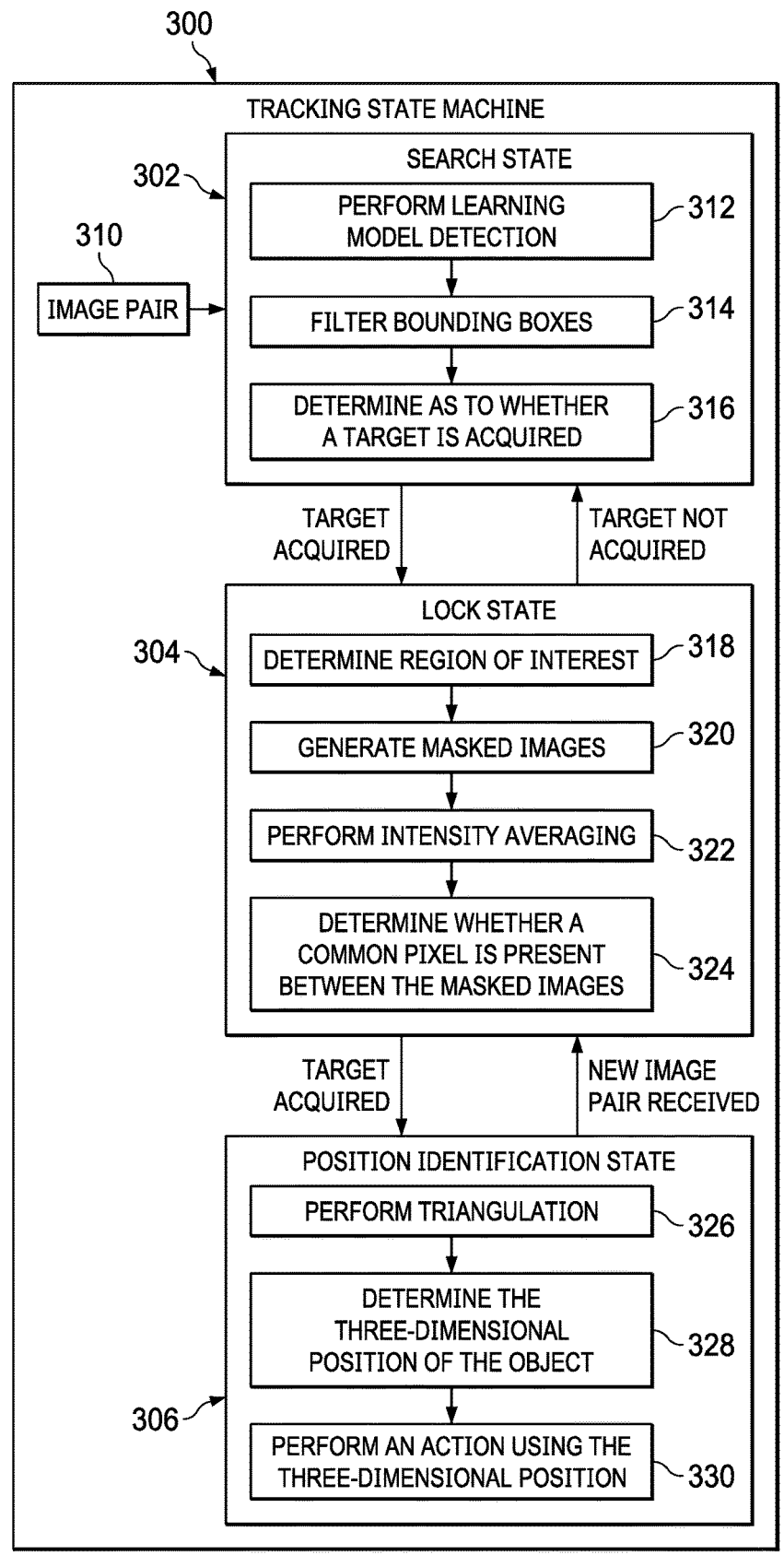
FIG. 3 is an illustration of a block diagram of a state machine for an object tracker in accordance with an illustrative embodiment.

Turning next to FIG. 3, an illustration of a block diagram of a state machine for an object tracker is depicted in accordance with an illustrative embodiment. In this illustrative example, tracking state machine 300 is an example of a state machine that can be implemented in object tracker 208 in FIG. 2. Tracking state machine 300 comprises search state 302, lock state 304, and position identification state 306.

Search state 302 can begin when image pair 310 is received. Image pair 310 is a pair of stereoscopic images in this example. In search state 302, tracking state machine 300 performs learning model detection on image pair 310 (operation 312). Image pair 310 is analyzed to detect the presence of an object in operation 312. In this depicted example, the detection can be performed using a machine learning model such as a machine learning model in artificial intelligence system 266 in FIG. 2. In the illustrative example, the machine learning model may employ a low rate detection algorithm such as a deep neural network.

The machine learning model can be trained to detect a set of object classes. An object class can be, for example, a drone, a micro aerial vehicle, a bird, a commercial airplane, or some other suitable type of object. The machine learning model performs a forward pass on each image in image pair 310 to produce bounding box detections for one or more objects of interest that may be in each of the images.

When a single object is present in image pair 310, the result of the detection can be the generation of a bounding box that encompasses the object detected in image pair 310. As a result, a bounding box is generated for each image in image pair 310. In operation 312 in search state 302, multiple bounding boxes can be generated for each image. When a single object is present in image pair 310, the result of the detection can be the generation of a bounding box that encompasses the object detected in image pair 310.

Tracking state machine 300 filters bounding boxes (operation 314). The filtering can be based on object class or on a desired confidence level for the presence of an object in a bounding box. The threshold for a confidence level can depend on a particular class of object. For example, a class for a drone may have one confidence level while a class for a bird has another confidence level. A class that combines both may require a higher confidence level in each of these classes alone. The filtering can also be based on the size of the bounding box.

Once the filtering is performed, a determination is made as to whether a target is acquired (operation 316). A target is acquired if at least one bounding box remains in image pair 310 after filtering.

When the target is acquired, tracking state machine 300 shifts to lock state 304. Otherwise, tracking state machine 300 remains in search state 302 and waits for another image pair to process to continue searching for an object.

In lock state 304, tracking state machine 300 determines a region of interest (operation 318). When tracking state machine 300 shifts from search state 302 to lock state 304, the region of interest is determined based on the bounding box determined for image pair 310. Subsequently, tracking state machine 300 shifts from position identification state 306 back to lock state 304 when a new image pair is received. When tracking state machine 300 shifts from position identification state 306 back to lock state 304, the region of interest can be determined using a prior region of interest when tracking state machine 300 shifts back to lock state 304 from position identification state 306.

In both cases, additional factors can be taken into account. For example, motion inputs such as motion inputs 227 in FIG. 2 can be taken into account.

Tracking state machine 300 generates masked images using the region of interest (operation 320). In operation 320, a masked image is generated for each image in image pair 310. Portions of pixels in image pair 310 outside of the region of interest can become black pixels such that these pixels cannot contribute to the intensity when intensity averaging is performed.

With the masked images, tracking state machine 300 performs intensity averaging on the masked images (operation 322). In operation 322, tracking state machine 300 determines a pixel with a largest weighted average intensity in each of the masked images. The location of the pixel is returned such that two locations are present in each of the two masked images. These two pixel locations represent common pixels between the masked images. The two pixels are common pixels for the same location on the object in the region of interest in the masked images.

The use of this high rate detection algorithm can be performed in an order of milliseconds. As the frame per second of imaging system increases, the probability that the object will remain in the region of interest increases.

A determination is made as to whether common pixels are present between the masked images processed using intensity averaging (operation 324).

Tracking state machine 300 shifts to position identification state 306 when a common pixel is present between the masked images. The determination of whether a common pixel is present in the masked images can be determined in a number of ways. For example, a threshold for a minimum intensity can be used to classify the common pixel as not found when the intensity value is below the threshold.

When the common pixel is present, the target is considered to be acquired. Otherwise, the target is lost and no longer acquired with tracking state machine 300 returning to search state 302.

In position identification state 306, tracking state machine 300 performs triangulation using the common pixels (operation 326). In operation 326, the triangulation is performed using the common pixels detected in the masked images. Given the pixel location (u,v) in the image, a three-dimensional position of the target can be created in a camera coordinate frame (x,y,z). The position of the camera coordinate can be converted to a North East Down (NED) coordinate frame with the vehicle being at the origin of this NED coordinate frame. The object location can be converted to a global coordinate frame using known techniques.

Tracking state machine 300 predicts the subsequent location of the object (operation 328). In this illustrative example, the set location can be formed in a number of ways. For example, a Kalman filter can be used to predict at least one of a subsequent position, a future velocity, a trajectory, or some other characteristic of the object. In the illustrative example, equations of motion can be used to account for system latency via forward predictions. In other illustrative examples, other techniques in addition to or in place of the Kalman filter can be used. These techniques can include at least one of a particle filter, a two-dimensional interpolation, a linear interpolation, or some other suitable technique.

Predicting the subsequent location of the object as well as other information can allow for extending detections and increasing throughput of the process. In other words, when returning the search state 302 is not needed, the processing speed in tracking an object can be increased.

When the prediction results in the object are not being found in a region of interest, the process can shift back to search state 302.

The tracking state machine 300 performs an action using the three-dimensional position of the object (operation 330). For example, tracking state machine 300 can control a mirror to direct a laser beam to illuminate the object. The mirror can be controlled to continue to point the laser beam at the object.

In the illustrative example, tracking state machine 300 shifts back to lock state 304 when a new image pair is received. In this case, the region of interest determined in operation 318 using the region of interest previously determined for the prior image pair.

Thus, tracking state machine 300 can process image pairs more quickly without returning to search state 302 to detect an object in the image and generate a bounding box.

In the illustrative example, although the states are shown as being performed sequentially, this illustration is not meant to limit the manner in which tracking state machine 300 can be implemented or operate. For example, position identification state 306 can run in parallel to search state 302 and lock state 304 in other illustrative examples.

Figure 4:
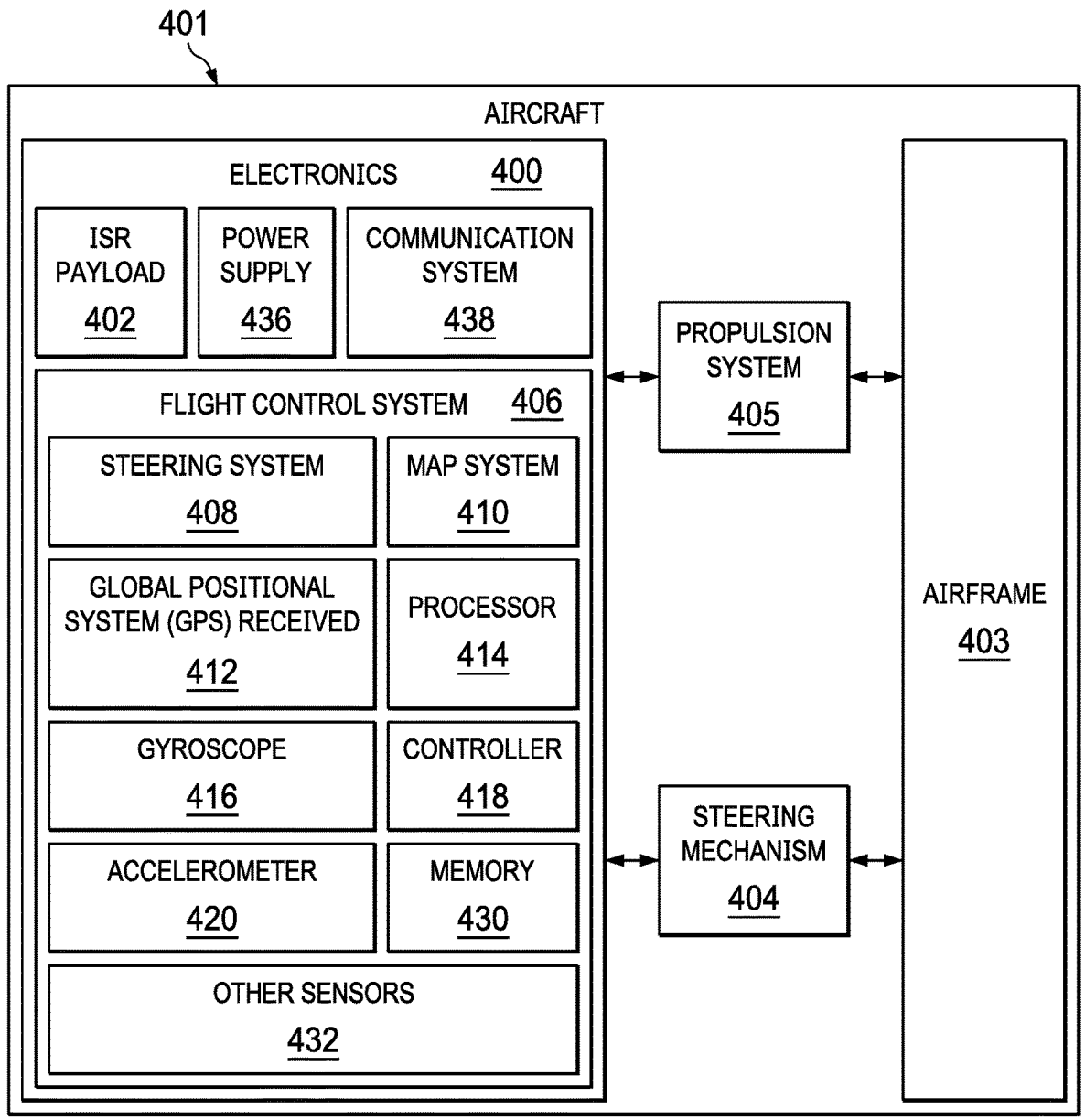
FIG. 4 is an illustration of a block diagram of an aircraft and its components in accordance with an illustrative embodiment.

With reference now to FIG. 4, an illustration of a block diagram of an aircraft and its components is depicted in accordance with an illustrative embodiment. In this illustrative example, aircraft 401 is an example of one implementation for platform 212 in FIG. 2. Aircraft 401 can be, for example, micro aerial vehicle 102 in FIG. 1.

In this illustrative example, aircraft 401 includes airframe 403, electronics 400, propulsion system 405, and steering mechanism 404. Airframe 403 is a mechanical structure for aircraft 401. Airframe 403 can include, for example, a fuselage, an undercarriage, wings, landing gear, and other physical structures. In this illustrative example, airframe 403 carries electronics 400, propulsion system 405, and steering mechanism 404.

As depicted, electronics 400 include intelligence, surveillance, and reconnaissance (ISR) payload 402, power supply 436, communication system 438, and flight control system 406. In this depicted example, ISR payload 402 includes a framework or housing that carries components such as imaging system 210 and laser projection system 222 in FIG. 2.

Although a particular arrangement of components is illustrated in FIG. 4, the arrangement of components may vary in other illustrative examples. For example, ISR payload 402 may be located within one or more housings that are removable from aircraft 401. Alternatively, components in ISR payload 402 can be integrated into aircraft 401 instead of being placed in a housing that is attached to aircraft 401 or placed in aircraft 401.

Further, at least one of ISR payload 402, flight control system 406, or communication system 438 can share components, such as memory, sensors, processors, or controllers. Additionally, ISR payload 402 can be removably coupled to aircraft 401 or components in this module can be integrated into airframe 403 for aircraft 401 in any desired manner. Thus, the arrangement of the various components may be configured as desired by the designer or operator and therefore should not be limited to a particular example described or illustrated herein.

In this illustrative example, the modular housing for ISR payload 402 can be constructed of plastic, metal, wood, carbon fiber, a composite material, ceramic, or any material suitable for the purposes of a particular vehicle or type of vehicle. The modular housing may be detachable or ejectable, or it may be permanently coupled to the vehicle. The modular housing may be attached to aircraft 401 in any manner known to one of ordinary skill in the art. The modular housing may include openings for devices such as imaging system 210 and laser projection system 222 in FIG. 2. In some illustrative examples, controller 228 can also be located in ISR payload 402 or can be located in flight control system 406 or in some other suitable component within ISR payload 402.

Although this example shows these components as being located in a housing for ISR payload 402, this illustration is for purposes of illustrating one manner in which these components can be implemented. This illustration is not meant to limit the manner in which other illustrative examples can be implemented. For example, these components can be distributed in other locations or integrated as part of aircraft 401 in other illustrative examples.

In this illustrative example, steering mechanism 404 can be configured to steer aircraft 401 on a flight path to reach an objective. Steering mechanism 404 can be operated autonomously or under manned control. In this illustrative example, steering mechanism 404 responds to signals from controller 418 in flight control system 406, which may employ feedback or other control systems to direct aircraft 401 along a flight path.

As depicted, communication system 438 is a physical device and may be, for instance, a wireless transceiver and antenna. Communication system 438 can exchange information with a remote computer system. Communication system 438 can transmit information generated by ISR payload 402 to a remote location for processing or storage. For example, communication system 438 can send images or other data to a ground location or other aircraft.

In this illustrative example, flight control system 406 can determine one or more flight paths for aircraft 401 to reach a desired location based upon signals received from the components of a navigation system. Flight control system 406 can calculate, generate, and send navigation commands, such as data signals, to steering mechanism 404 to direct aircraft 401 along a flight path.

In this illustrative example, flight control system 406 includes steering system 408, map system 410, global positioning system (GPS) receiver 412, processor 414, gyroscope 416, controller 418, accelerometer 420, and memory 430. Flight control system 406 may also include the components described above as being part of electronics 400, as well as other sensors 432. For example, other sensors 432 can also include other flight instrumentation, sensors, processing circuitry, communications circuitry, an optical system including cameras and other sensors that are necessary or useful for operation of an unmanned aerial system, or other autonomously or manually piloted aircraft.

As depicted, map system 410 can be a part of a map-based flight control system that provides positional information about natural and manmade features within a region. Map system 410 can communicate with other components in flight control system 406 to support navigation of aircraft 401. While this function can include providing map information for calculation of routes, this function can also include independent navigational capabilities.

For example, map system 410 can provide a map-based navigation system that stores a map of an operating environment including one or more objects. The map-based navigation system may be coupled to cameras and configured to determine a position of a vehicle by comparing stored objects to a visible environment, which may provide position data in the absence of global positioning system data or other positional information.

In this example, global positioning system receiver (GPS) 412 is a physical system and can be a part of a global positioning system configured to determine a position of aircraft 401. Global positioning system receiver (GPS) 412 can include any currently used global positioning system hardware, including conventional, satellite-based systems as well as other systems using beacons, positional signals, and or other sources of positioning information.

As depicted, gyroscope 416 is a physical device configured to detect rotation of aircraft 401. Gyroscope 416 can communicate with the other components in flight control system 406 to control operation of aircraft 401 and navigate aircraft 401 along a flight path. Gyroscope 416 can generate information that identifies an orientation of aircraft 401.

In the illustrative example, accelerometer 420 is a physical device configured to detect a linear motion of aircraft 401. Accelerometer 420 can include currently used accelerometers and can communicate with the other components in flight control system 406 to control operation of aircraft 401 and navigate aircraft 401 along a flight path.

In this illustrative example, processor 414 is a physical device and can be in communication with controller 418, other components in flight control system 406, steering mechanism 404, ISR payload 402, and the other various other components, systems, and subsystems that may be present in aircraft 401. Processor 414 can be an internal processor in a data processing system such as in aircraft 401 to support the various functions such as navigational functions or image processing functions. Processor 414 can be configured to control operation of at least one of aircraft 401, flight control system 406, or ISR payload 402.

As depicted, processor 414 can perform processing and calculation functions to support at least one of navigation, generating images, or tracking objects. In this illustrative example, object tracker 208 can run in processor 414. Processor 414 may include a number of different processors cooperating to perform the steps described herein, such as where an internal processor in aircraft 401 controls operation of aircraft 401 while another processor assigned to ISR payload 402 controls at least one of tracking objects or illuminating objects with a laser beam.

In one illustrative example, processor 414 can be configured to receive an image pair of the object from an imaging system and ISR payload 402 illuminated by a laser beam emitted from the laser projection system in ISR payload 402. Processor 414 also can be configured to determine a bounding box for the object in the stereoscopic images and determine a region of interest in the stereoscopic images based on the bounding box for the object in the stereoscopic images. Processor 414 can be configured to apply a mask based on the region of interest to the stereoscopic images and perform intensity averaging on the masked images to detect a set of pixels having a greatest intensity in the masked images. The set of pixels in the masked images is a set of common pixels in the masked images in which the set of common pixels is assumed to have a same location in both of the masked images. Processor 414 can be configured to determine a three-dimensional position of the object using the set of common pixels.

As depicted, processor 414 can be configured to predict a subsequent position of the object using the three-dimensional position of the object and a set of prior three-dimensional positions of the object. This subsequent position can be used to direct the laser beam to continue to illuminate the object being tracked.

Controller 418 can operate to control components in aircraft 401 such as flight control system 406, ISR payload 402, propulsion system 405, or steering mechanism 404. Controller 418 is in communication with processor 414, aircraft 401, flight control system 406, ISR payload 402, steering mechanism 404, and the other various components of the devices and systems described herein. Controller 418 can also control the operation of ISR payload 402. This control can be in addition to or in place of the control described with respect to processor 414.

As depicted, controller 418 can include any hardware, software, or some combination thereof for controlling the various components in aircraft 401 and the flight control system 406 described herein, including, without limitation, microprocessors, microcontrollers, application-specific integrated circuits, programmable gate arrays, and any other digital and/or analog components, as well as combinations thereof, along with inputs and outputs for communicating control signals, drive signals, power signals, sensor signals, and other suitable types of signals.

Thus, processor 414, controller 418, and other components in flight control system 406 in electronics 400 can also provide information and control the operation of ISR payload 402. For example, these components can control ISR payload 402 to generate images and direct emission of a laser beam.

In this illustrative example, memory 430 is a physical device and can include local memory or a remote storage device that stores a log of data for flight control system 406, including, without limitation, images generated by ISR payload 402, orientations, speeds, flight paths, steering specifications, global positioning system coordinates, sensor readings, and other suitable information. The information stored in memory 430 can be accessed by at least one of processor 414 or controller 418 in this example.

The illustrations of tracking environment 200 in FIGS. 2-4 are not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, one or more components of object tracking system 204 may not be connected to platform 212 in some illustrative examples. In one alternative example, object tracker 208 can be located in a different location from platform 212. In this implementation, computer system 206 with object tracker 208 can receive image pairs from imaging system 210 over a wireless connection. In still other illustrative examples, object tracker 208 can be distributed in different locations.

In yet another example, object tracker 208 can make other predictions in addition to or in place of predicting trajectory 252 for object 202. For example, object tracker 208 can predict the future velocity, acceleration, or other information about object 202.

Further, when all of object tracking system 204 is connected to platform 212, computer system 206 is one or more data processing systems in platform 212. For example, when platform 212 is a commercial airplane, computer system 206 can be one or more data processing systems in a computer network in the aircraft. When platform 212 is a micro aerial vehicle, computer system 206 can be a processor or controller in the micro aerial vehicle. In other illustrative examples, object tracking system 204 can be distributed between platform 212 and other locations. For example, imaging system 210 can be connected to platform 212 when platform 212 is a micro aerial vehicle. Object tracker 208 can be in a remote location communicating with the micro aerial vehicle using wireless communications.

In yet another illustrative example, stereoscopic imaging system 214 and laser projection system 222 can be a part of intelligence, surveillance, and, reconnaissance (ISR) payload such as ISR payload 106 in FIG. 1.

In the illustrative example, FIGS. 5-8 illustrate the processing of images in accordance with an illustrative embodiment. The different operations performed on damages in these figures can be performed by object tracker 208 in FIG. 2.

Figure 5:
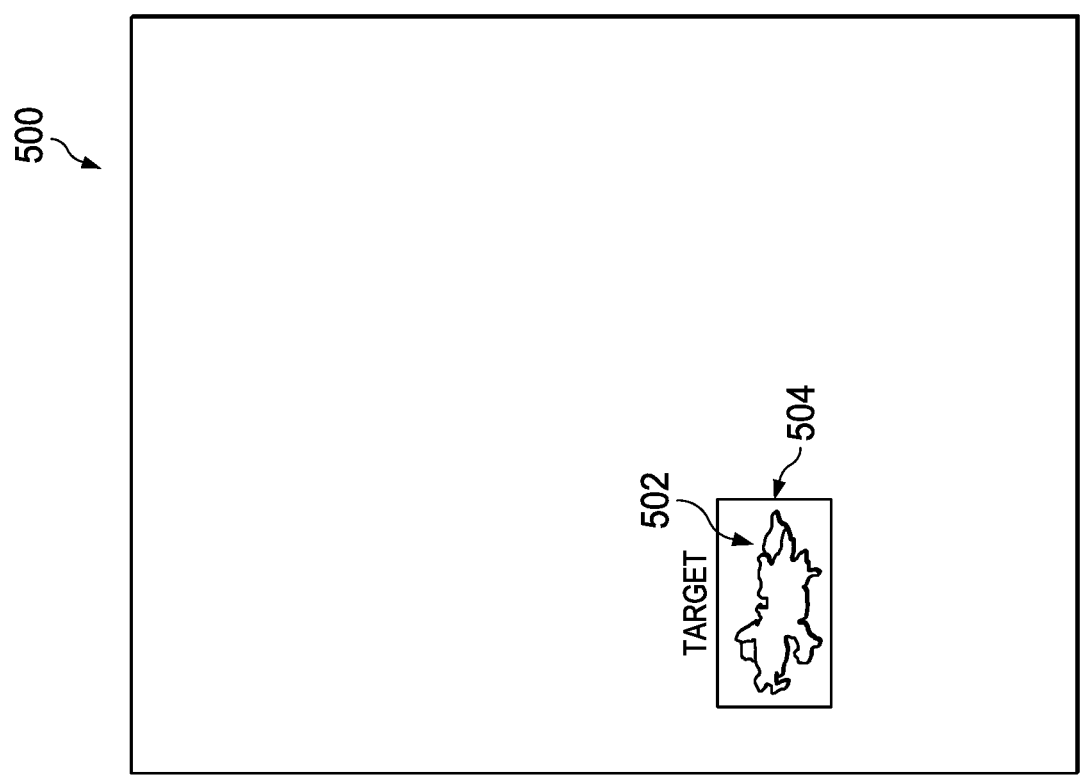
FIG. 5 is an illustration of an image in accordance with an illustrative embodiment.

Turning first to FIG. 5, an illustration of an image is depicted in accordance with an illustrative embodiment. Image 500 is an example of an image in image pair 216 in FIG. 2. As depicted in this example, object detection, such as learning model detection in operation 312 in FIG. 3, has been performed on image 500. In this illustrative example, object 502 has been detected with bounding box 504 generated around object 502.

Figure 6:
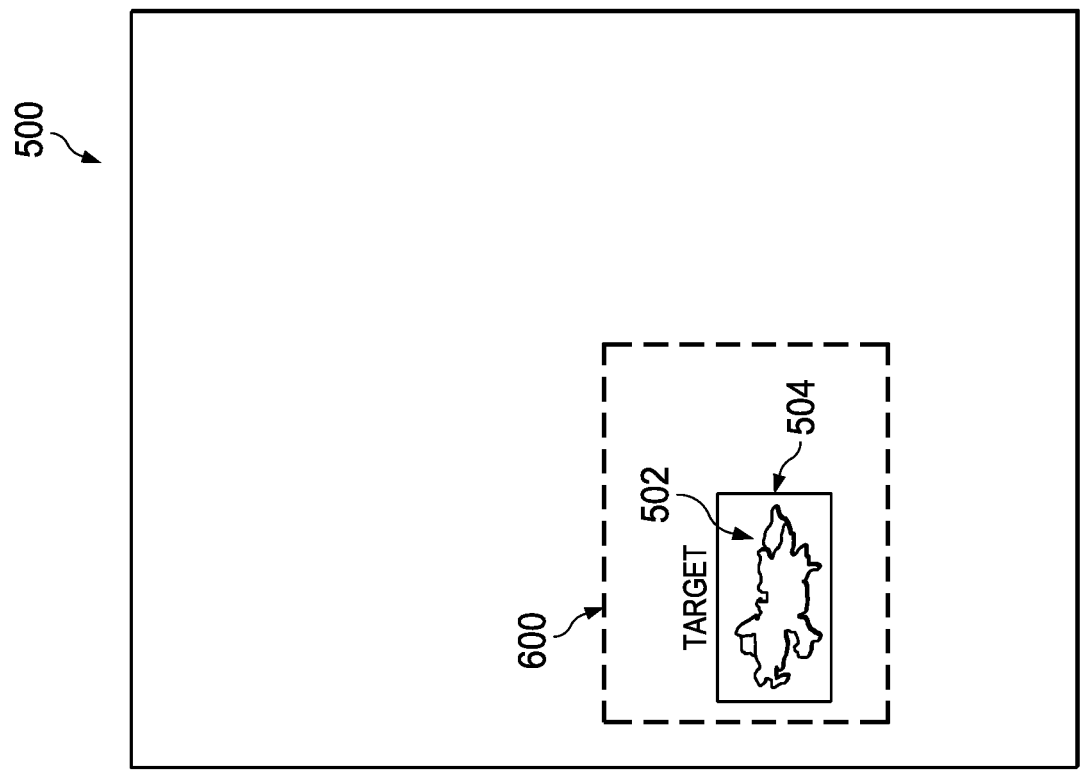
FIG. 6 is an illustration of a region of interest in an image in accordance with an illustrative embodiment.

Turning next to FIG. 6, an illustration of a region of interest in an image is depicted in accordance with an illustrative embodiment. As depicted, region of interest 600 is determined for image 500. In this example, region of interest 600 encompasses bounding box 504.

Figure 7:
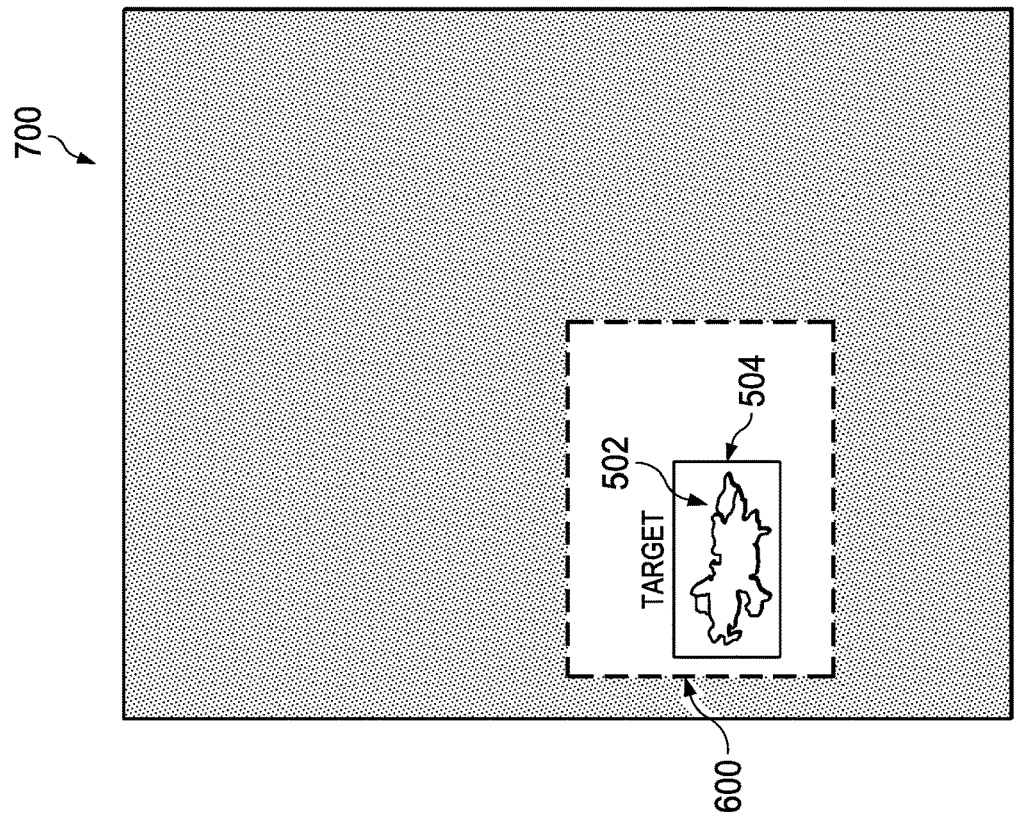
FIG. 7 is an illustration of a masked image in accordance with an illustrative embodiment.

In FIG. 7, an illustration of a masked image is depicted in accordance with an illustrative embodiment. In this figure, masked image 700 is generated by applying a mask based on region of interest 600. The mask causes all pixels outside of region of interest 600 to be black. In this manner, portions of masked image 700 outside of region of interest 600 do not contribute to intensity averaging that is performed to identify a common pixel between masked image 700 and another corresponding masked image from the same image pair.

Figure 8:
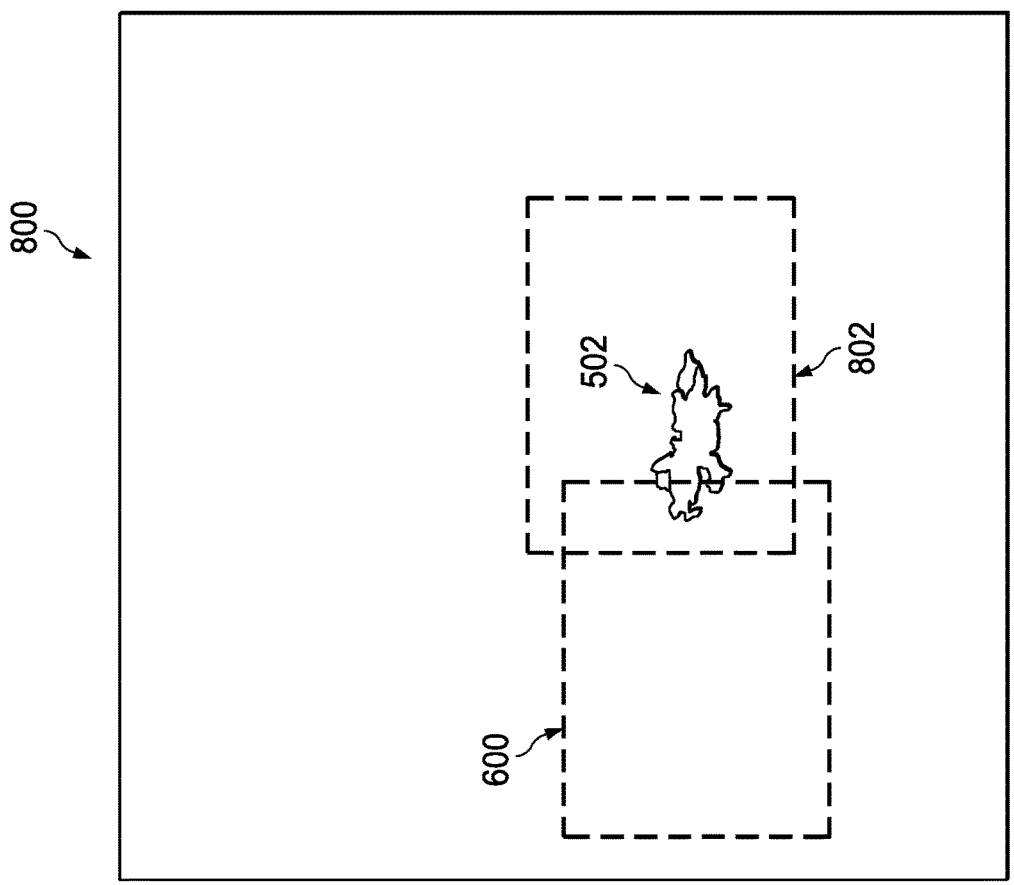
FIG. 8 is an illustration of a subsequent image in accordance with an illustrative embodiment.

With reference now to FIG. 8, an illustration of a subsequent image is depicted in accordance with an illustrative embodiment. As depicted, subsequent image 800 is an image generated subsequently to image 500 in FIGS. 5-7. In this illustrative example, object detection is not performed on subsequent image 800. Instead, region of interest 802 is determined based on region of interest 600 and a predicted subsequent position of object 502.

In other words, an operation in which object detection and bounding box generation occur can be omitted. Determining a new region of interest based on the prior region of interest and a predicted subsequent position of the target object can take at least one of less time or processor resources than performing object detection and bounding box generation. As a result, object tracking can be performed more quickly enabling more accurate tracking of an object in real-time.

Illustrations of the images in FIGS. 5-8 are provided for purposes of illustrating one manner in which an illustrative example can be implemented. For example, an image may contain more than one object in which bounding boxes are identified for those objects detected in the image. In other words, this process can be applied to multiple objects in which multiple regions of interests are generated to track the objects in an image.

Figure 9:
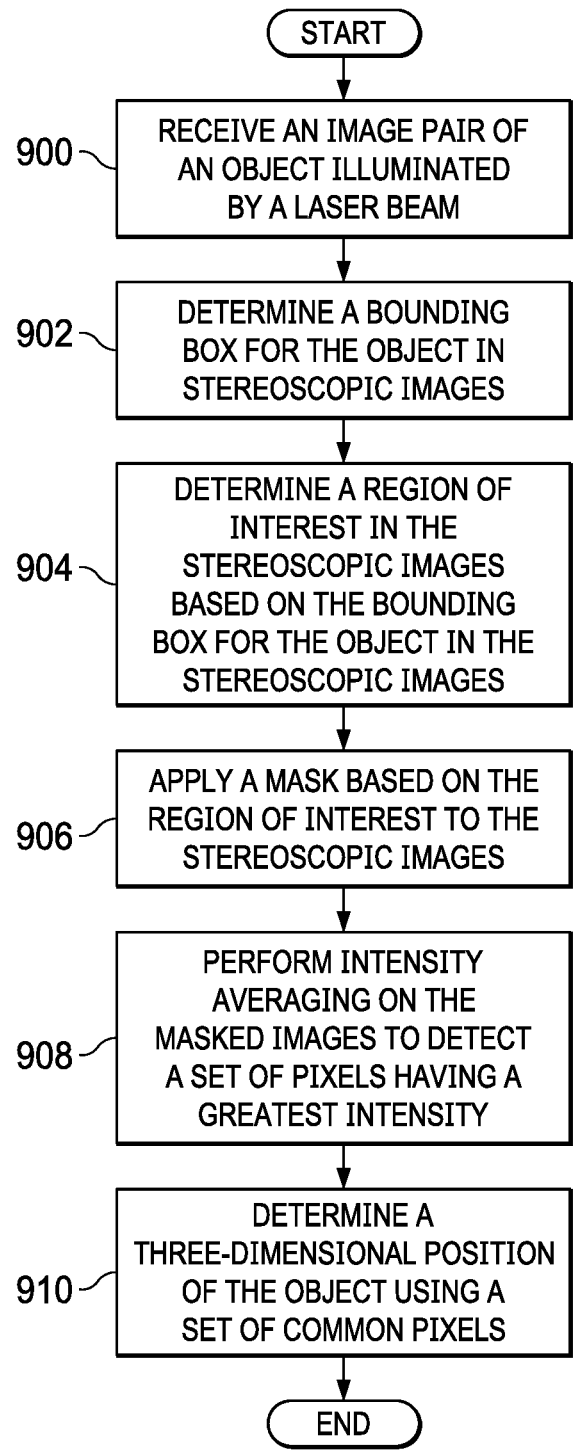
FIG. 9 is an illustration of a flowchart of a process for tracking an object in accordance with an illustrative embodiment.

Turning next to FIG. 9, an illustration of a flowchart of a process for tracking an object is depicted in accordance with an illustrative embodiment. The process in FIG. 9 can be implemented in hardware, software, or both. When implemented in software, the process can take the form of program code that is run by one or more processor units located in one or more hardware devices in one or more computer systems. For example, the process can be implemented in object tracker 208 in computer system 206 in FIG. 2.

The process begins by receiving an image pair of an object illuminated by a laser beam (operation 900). In operation 900, the image pair comprises two stereoscopic images generated by a stereoscopic imaging system. The process determines a bounding box for the object in stereoscopic images (operation 902).

The process determines a region of interest in the stereoscopic images based on the bounding box for the object in the stereoscopic images (operation 904). The process applies a mask based on the region of interest to the stereoscopic images (operation 906). In operation 906, the mask masks out portions of the stereoscopic images outside of the region of interest to form masked images.

The process performs intensity averaging on the masked images to detect a set of pixels having a greatest intensity in the masked images (operation 908). The set of pixels in the masked images in operation 908 are a set of common pixels in the masked images in which the set of common pixels is assumed to have a same location in both of the masked images. The process determines a three-dimensional position of the object using a set of common pixels (operation 910). The process terminates thereafter.

Figure 10:
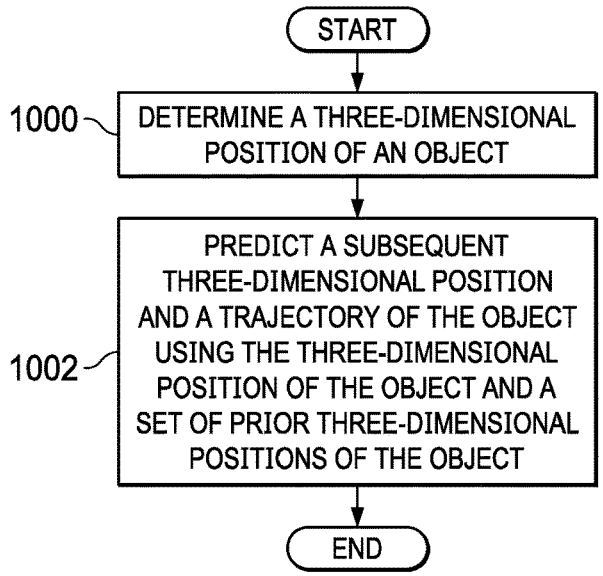
FIG. 10 is an illustration of a flowchart of a process for predicting a subsequent three-dimensional position of an object in accordance with an illustrative embodiment.

Turning next to FIG. 10, an illustration of a flowchart of a process for predicting a subsequent three-dimensional position of an object is depicted in accordance with an illustrative embodiment. The process in FIG. 10 can be implemented in hardware, software, or both. When implemented in software, the process can take the form of program code that is run by one or more processor units located in one or more hardware devices in one or more computer systems. For example, the process can be implemented in object tracker 208 in computer system 206 in FIG. 2.

The process begins by determining a three-dimensional position of an object (operation 1000). In this illustrative example, the three-dimensional position of the object can be determined using the operations in the flowchart in FIG. 9.

The process predicts a subsequent three-dimensional position and a trajectory of the object using the three-dimensional position of the object and a set of prior three-dimensional positions of the object (operation 1002). The process terminates thereafter.

Figure 11:
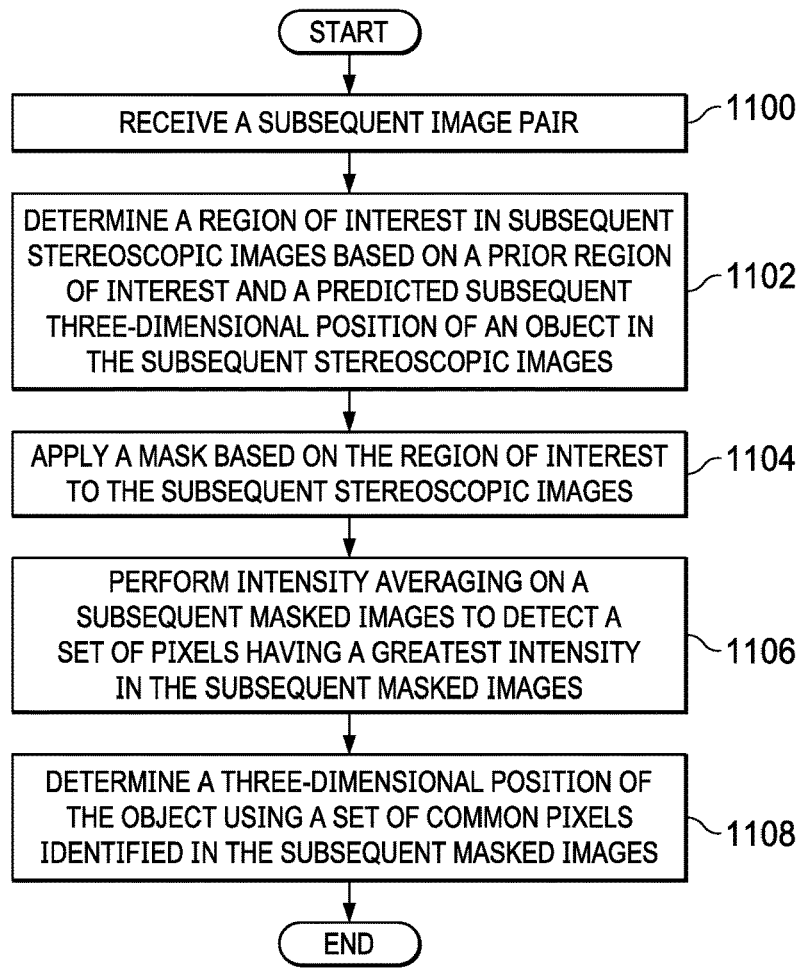
FIG. 11 is an illustration of a flowchart of a process for predicting a subsequent three-dimensional position of an object in accordance with an illustrative embodiment.

With reference now to FIG. 11, an illustration of a flowchart of a process for predicting subsequent three-dimensional positions of an object is depicted in accordance with an illustrative embodiment. The process in FIG. 11 can be implemented in hardware, software, or both. When implemented in software, the process can take the form of program code that is run by one or more processor units located in one or more hardware devices in one or more computer systems. For example, the process can be implemented in object tracker 208 in computer system 206 in FIG. 2.

This process can be used when subsequent image pairs are received and can begin after the completion of operation 910 in FIG. 9. The illustrated process in FIG. 11 omits object detection and boundary box generation, resulting in at least one of increasing a speed at which a three-dimensional position of the object can be determined or reducing a use of processor resources used to determine a three-dimensional position of the object.

The process begins by receiving a subsequent image pair (operation 1100). In operation 1100, the subsequent image pair comprises subsequent stereoscopic images generated by a stereoscopic imaging system. The process determines a region of interest in subsequent stereoscopic images based on a prior region of interest and a predicted subsequent three-dimensional position of an object in the subsequent stereoscopic images (operation 1102).

The process applies a mask based on the region of interest to the subsequent stereoscopic images (operation 1104). The mask in operation 1104 masks out the portions of the subsequent stereoscopic images outside of the region of interest to form subsequent masked images.

The process performs intensity averaging on subsequent masked images to detect a set of pixels having a greatest intensity in the subsequent masked images (operation 1106). The set of pixels in the subsequent masked images in operation 1106 is the set of common pixels in the subsequent masked images that is assumed to have the same location. The process determines a three-dimensional position of the object using a set of common pixels identified in the subsequent masked images (operation 1108). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 12:
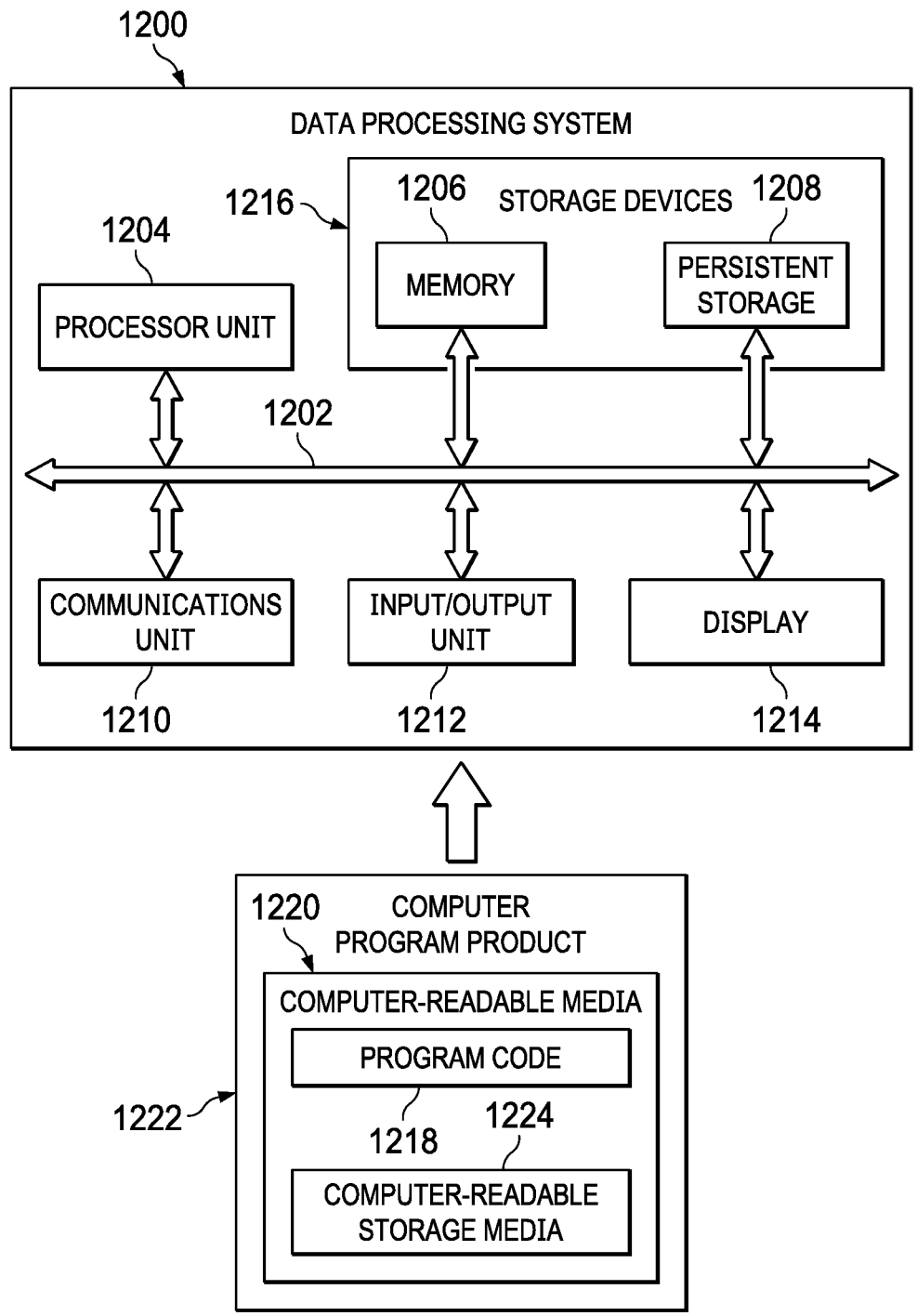
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 can be used to implement computer system 206. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1204 can may be implemented using one or more heterogeneous processor systems in which a main processor is present with secondary processors on a single chip. As another illustrative example, processor unit 1204 can be a symmetric multi-processor system containing multiple processors of the same type on a single chip.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 can take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 can provide a connection for user input through at least one of a keyboard, a mouse, or some other suitable input device. Further, input/output unit 1212 can send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which can be located in a memory, such as memory 1206.

These instructions are referred to as program code, computer usable program code, or computer-readable program code that can be read and executed by a processor in processor unit 1204. The program code in the different embodiments can be embodied on different physical or computer-readable storage medium, such as memory 1206 or persistent storage 1208.

Program code 1218 is located in a functional form on computer-readable medium 1220 that is selectively removable and can be loaded onto or transferred to data processing system 1200 for execution by processor unit 1204. Program code 1218 and computer-readable medium 1220 form computer program product 1222 in these illustrative examples. In the illustrative example, computer-readable medium 1220 is computer-readable storage medium 1224.

In these illustrative examples, computer-readable storage medium 1224 is a physical or tangible storage device used to store program code 1218 rather than a medium that propagates or transmits program code 1218. Computer readable storage medium 1218, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1218 can be transferred to data processing system 1200 using a computer-readable signal media. The computer-readable signal media can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1220" can be singular or plural. For example, program code 1218 can be located in computer-readable media 1220 in the form of a single storage device or system. In another example, program code 1218 can be located in computer-readable media 1220 that is distributed in multiple data processing systems. In other words, some instructions in program code 1218 can be located in one data processing system while other instructions in program code 1218 can be located in one data processing system. For example, a portion of program code 1218 can be located in computer-readable media 1220 in a server computer while another portion of program code 1218 can be located in computer-readable media 1220 located in a set of client computers.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, can be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program code 1218.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Thus, one or more of the illustrative examples provide a method, apparatus, system, and computer program product for tracking objects. In one illustrative example, a method tracks an object. An image pair of the object illuminated by a laser beam is received. The image pair comprises stereoscopic images generated by a stereoscopic imaging system. A bounding box is determined for the object in the stereoscopic images. A region of interest in the stereoscopic images is determined based on the bounding box for the object in the stereoscopic images. A mask is applied based on the region of interest to the stereoscopic images. The mask masks out portions of the stereoscopic images outside of the region of interest to form masked images. Intensity averaging is performed on the masked images to detect a set of pixels having a greatest intensity in the masked images. The set of pixels in the masked images is a set of common pixels in the masked images in which the set of common pixels is assumed to have a same location in both of the masked images. A three-dimensional position of the object is determined using the set of common pixels.

One illustrative example provides an improved ability to track an object. For example, the illustrative example enables real-time tracking of objects. The tracking capability in the illustrative example can be used to perform various actions including but not limited to detection and avoidance of other objects. For example, an illustrative example can be used in a commercial airplane to avoid collisions with other aircraft that may fly in the same airspace as the commercial airplane. In another illustrative example, tracking of the object can be used to follow or perform surveillance of the object. In yet another illustrative example, tracking can be used to coordinate the flight of the swarm of unmanned aerial vehicles.

One or more features of the illustrative examples are described in the following clauses. These clauses are examples of features not intended to limit other illustrative examples.

Clause 1.

A method for tracking an object, the method comprising:

receiving an image pair of the object illuminated by a laser beam, wherein the image pair comprises stereoscopic images generated by a stereoscopic imaging system;

determining a bounding box for the object in the stereoscopic images;

determining a region of interest in the stereoscopic images based on the bounding box for the object in the stereoscopic images;

applying a mask based on the region of interest to the stereoscopic images, wherein the mask masks out portions of the stereoscopic images outside of the region of interest to form masked images;

performing intensity averaging on the masked images to detect a set of pixels having a greatest intensity in the masked images, wherein the set of pixels in the masked images is a set of common pixels in the masked images in which the set of common pixels is assumed to have a same location in both of the masked images; and determining a three-dimensional position of the object using the set of common pixels Clause 2.

The method of clause 1 further comprising:

predicting a subsequent three-dimensional position of the object using the three-dimensional position of the object and a set of prior three-dimensional positions of the object.

Clause 3.

The method of clause 2, wherein predicting the subsequent three-dimensional position of the object using the three-dimensional position of the object and the set of prior three-dimensional positions of the object comprises:

predicting the subsequent three-dimensional position and a trajectory of the object using the three-dimensional position of the object and the set of prior three-dimensional positions of the object.

Clause 4.

The method of clause 2 further comprising:

receiving a subsequent image pair, wherein the subsequent image pair comprises subsequent stereoscopic images generated by the stereoscopic imaging system;

determining the region of interest in the subsequent stereoscopic images based on a prior region of interest and a predicted subsequent three-dimensional position of the object in the subsequent stereoscopic images;

applying the mask based on the region of interest to the subsequent stereoscopic images, wherein the mask masks out the portions of the subsequent stereoscopic images outside of the region of interest to form subsequent masked images;

performing intensity averaging on the subsequent masked images to detect the set of pixels having the greatest intensity in the subsequent masked images, wherein the set of pixels in the subsequent masked images is the set of common pixels in the subsequent masked images that is assumed to have the same location; and determining the three-dimensional position of the object using the set of common pixels identified in the subsequent masked images.

Clause 5.

The method of clause 2 further comprising:

directing the laser beam to illuminate the object using the predicted subsequent three-dimensional position of the object.

Clause 6.

The method of clause 1, wherein determining the three-dimensional position of the object using the set of common pixels comprises:

determining a position of the object in a camera coordinate frame using a triangulation performed on the set of common pixels in the masked images; and converting the position of the object from the camera coordinate frame to a global coordinate frame to obtain the three-dimensional position of the object.

Clause 7.

The method of clause 1, wherein determining the region of interest in the stereoscopic images based on the bounding box for the object in the stereoscopic images comprises:

identifying motion inputs; and determining the region of interest in the stereoscopic images based on the bounding box for the object in the stereoscopic images and the motion inputs.

Clause 8.

The method of clause 1, wherein the intensity averaging is selected from at least one of a weighted intensity averaging, a maximum pixel value, or a sliding window average.

Clause 9.

The method of clause 1, wherein the region of interest is selected to include the bounding box, be located in the bounding box, or overlap a portion of the bounding box.

Clause 10.

The method of clause 1, wherein the three-dimensional position of the object comprises a location of the object in three-dimensional space and an orientation of the object.

Clause 11.

The method of clause 1, wherein the stereoscopic imaging system is located on one of an aircraft, an airplane, a rotorcraft, an unmanned aerial vehicle, a micro aerial vehicle, a ship, a train, a missile, a rocket, a spacecraft, a satellite, a stationary platform, a moving platform, an aquatic platform, a space platform, and a building.

Clause 12.

The method of clause 1, wherein the object is one of a moving object, a stationary object, an aerial vehicle, an aircraft, an airplane, a rotorcraft, an unmanned aerial vehicle, a micro aerial vehicle, a missile, a rocket, a spacecraft, a ground vehicle, an unmanned ground vehicle, a train, a surface ship, bus, a semi-trailer truck, and a high mobility multipurpose wheeled vehicle.

Clause 13.

An object tracking system comprising:

a computer system; and an object tracker in the computer system, wherein the object tracker is configured to:

receive an image pair of the object illuminated by a laser beam, wherein the image pair comprises stereoscopic images generated by a stereoscopic imaging system;

determine a bounding box for the object in the stereoscopic images;

determine a region of interest in the stereoscopic images based on the bounding box for the object in the stereoscopic images;

apply a mask based on the region of interest to the stereoscopic images, wherein the mask masks out portions of the stereoscopic images outside of the region of interest to form masked images;

perform intensity averaging on the masked images to detect a set of pixels having a greatest intensity in the masked images, wherein the set of pixels in the masked images us a set of common pixels in the masked images in which the set of common pixels is assumed to have a same location in both of the masked images; and determine a three-dimensional position of the object using the set of common pixels Clause 14.

The object tracking system of clauses 13, wherein the object tracker is configured to:

predict a subsequent three-dimensional position of the object using the three-dimensional position of the object and a set of prior three-dimensional positions of the object.

Clause 15.

The object tracking system of clause 14, wherein in predicting the subsequent three-dimensional position of the object using the three-dimensional position of the object and the set of prior three-dimensional positions of the object, the object tracker is configured to:

predict the subsequent three-dimensional position of the object using the three-dimensional position of the object and the set of prior three-dimensional positions of the object.

Clause 16.

The object tracking system of clause 14, wherein the object tracker is configured to:

receive a subsequent image pair, wherein the subsequent image pair comprises subsequent stereoscopic images generated by the stereoscopic imaging system;

determine the region of interest in the subsequent stereoscopic images based on a prior region of interest and a predicted subsequent three-dimensional position of the object in the stereoscopic images;

apply the mask based on the region of interest to the subsequent stereoscopic images, wherein the mask masks out the portions of the subsequent stereoscopic images outside of the region of interest to form subsequent masked images;

perform intensity averaging on the subsequent masked images to detect the set of pixels having the greatest intensity in the subsequent masked images, wherein the set of pixels in the subsequent masked images is the set of common pixels in the subsequent masked images that is assumed to have the same location; and determine the three-dimensional position of the object using the set of common pixels identified in the subsequent masked images.

Clause 17.

The object tracking system of clause 14, wherein the object tracker is configured to:

direct the laser beam to illuminate the object using the predicted subsequent three-dimensional position of the object.

Clause 18.

The object tracking system of clause 13, wherein in determining the three-dimensional position of the object using the set of common pixels, the object tracker is configured to:

determine a position of the object in a camera coordinate frame using a triangulation performed on the set of common pixels in the masked images; and convert the position of the object from the camera coordinate frame to a global coordinate frame to obtain the three-dimensional position of the object.

Clause 19.

The object tracking system of clause 13, wherein the object tracker includes a state machine comprising:

search state configured to receive the image pair of the object illuminated by the laser beam, wherein the image pair comprises the stereoscopic images generated by the stereoscopic imaging system and determine the bounding box for the object in the stereoscopic images;

a lock state configured to determine the region of interest in the stereoscopic images based on the bounding box for the object in the stereoscopic images; apply the mask based on the region of interest to the stereoscopic images, wherein the mask masks out the portions of the stereoscopic images outside of the region of interest to form the masked images; and perform the intensity averaging on the masked images to detect the set of pixels having the greatest intensity in the masked images, wherein the set of pixels in the masked images is the set of common pixels in the masked images in which the set of common pixels is assumed to have the same location in both of the masked images; and a position identifier state configured to determine the three-dimensional position of the object using the set of common pixels Clause 20.

The object tracking system of clause 19, wherein the search state is a machine learning model trained to detect objects in images.

Clause 21.

The object tracking system of clause 13, wherein in determining the region of interest in the stereoscopic images based on the bounding box for the object in the stereoscopic images, the object tracker is configured to:

identify motion inputs; and determine the region of interest in the stereoscopic images based on the bounding box for the object in the stereoscopic images and the motion inputs.

Clause 22.

The object tracking system of clause 13, wherein the intensity averaging is selected from at least one of a weighted intensity averaging, a maximum pixel value, or a sliding window average.

Clause 23.

The object tracking system of clause 13, wherein the region of interest is selected to include the bounding box, be located in the bounding box, or overlap a portion of the bounding box.

Clause 24.

The object tracking system of clause 13, wherein the three-dimensional position of the object comprises a location of the object in three-dimensional space and an orientation of the object.

Clause 25.

The object tracking system of clause 13, wherein the stereoscopic imaging system is located on one of an aircraft, an airplane, a rotorcraft, an unmanned aerial vehicle, a micro aerial vehicle, a ship, a train, a missile, a rocket, a spacecraft, a satellite, a stationary platform, a moving platform, and a building.

Clause 26.

The object tracking system of clause 13, wherein the object is one of method a moving object, a stationary object, an aerial vehicle, an aircraft, an airplane, a rotorcraft, an unmanned aerial vehicle, a micro aerial vehicle, a missile, a rocket, a spacecraft, a ground vehicle, an unmanned ground vehicle, a train, a surface ship, bus, a semi-trailer truck, and a high mobility multipurpose wheeled vehicle.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for tracking an object, the method comprising:
    determining a region of interest in an image pair based on a bounding box determined for the object in the image pair;
    applying a mask based on the region of interest to the image pair, wherein the mask masks out portions of the image pair outside of the region of interest to form masked images;
    performing intensity averaging on the masked images to detect a set of pixels having a greatest intensity in the masked images, wherein the set of pixels in the masked images is a set of common pixels in the masked images in which the set of common pixels is assumed to have a same location in both of the masked images; and
    determining a three-dimensional position of the object using the set of common pixels.

2. The method of claim 1 further comprising:
    determining the bounding box for the object in the image pair.

3. The method of claim 1 further comprising:
    predicting a subsequent three-dimensional position of the object using the three-dimensional position of the object and a set of prior three-dimensional positions of the object.

4. The method of claim 3, wherein predicting the subsequent three-dimensional position of the object using the three-dimensional position of the object and the set of prior three-dimensional positions of the object comprises:
    predicting the subsequent three-dimensional position and a trajectory of the object using the three-dimensional position of the object and the set of prior three-dimensional positions of the object.

5. The method of claim 3, wherein the image pair is a first image pair and further comprising:
receiving a subsequent image pair;
determining the region of interest in the subsequent image pair based on a prior region of interest and a predicted subsequent three-dimensional position of the object in the subsequent image pair;
applying the mask based on the region of interest to the subsequent image pair, wherein the mask masks out the portions of the subsequent image pair outside of the region of interest to form subsequent masked images;
performing intensity averaging on the subsequent masked images to detect the set of pixels having the greatest intensity in the subsequent masked images, wherein the set of pixels in the subsequent masked images is the set of common pixels in the subsequent masked images that is assumed to have the same location; and
determining the three-dimensional position of the object using the set of common pixels identified in the subsequent masked images.

6. The method of claim 3 further comprising:
illuminating the target with a laser beam such that the object is illuminated by the laser beam in the image pair; and
directing the laser beam to continue to illuminate the object with the laser beam using the predicted subsequent three-dimensional position of the object.

7. The method of claim 1, wherein determining the three-dimensional position of the object using the set of common pixels comprises:
determining a position of the object in a camera coordinate frame using a triangulation performed on the set of common pixels in the masked images; and
converting the position of the object from the camera coordinate frame to a global coordinate frame to obtain the three-dimensional position of the object.

8. The method of claim 1, wherein determining the region of interest in the image pair based on the bounding box for the object in the image pair comprises:
identifying motion inputs; and
determining the region of interest in the image pair based on the bounding box for the object in the image pair and the motion inputs.

9. The method of claim 1, wherein the intensity averaging is selected from at least one of a weighted intensity averaging, a maximum pixel value, or a sliding window average.

10. The method of claim 1, wherein the region of interest is selected to include the bounding box, be located in the bounding box, or overlap a portion of the bounding box.

11. The method of claim 1, wherein the three-dimensional position of the object comprises a location of the object in three-dimensional space and an orientation of the object.

12. An object tracking system comprising:
a computer system; and
an object tracker in the computer system, wherein the object tracker is configured to:
determine a region of interest in an image pair based on a bounding box determined for an object in the image pair;
apply a mask based on the region of interest to the image pair, wherein the mask masks out portions of the image pair outside of the region of interest to form masked images;
perform intensity averaging on the masked images to detect a set of pixels having a greatest intensity in the masked images, wherein the set of pixels in the masked images is a set of common pixels in the masked images in which the set of common pixels is assumed to have a same location in both of the masked images; and
determine a three-dimensional position of the object using the set of common pixels.

13. The object tracking system of claim 12, wherein the object tracker is configured to:
determine the bounding box for the object in the image pair.

14. The object tracking system of claim 13, wherein the object tracker includes a state machine comprising:
a search state configured to receive the image pair of the object illuminated by a laser beam, and determine the bounding box for the object in the image pair;
a lock state configured to determine the region of interest in the image pair based on the bounding box for the object in the image pair; apply the mask based on the region of interest to the image pair, wherein the mask masks out the portions of the image pair outside of the region of interest to form the masked images; and perform the intensity averaging on the masked images to detect the set of pixels having the greatest intensity in the masked images, wherein the set of pixels in the masked images is the set of common pixels in the masked images in which the set of common pixels is assumed to have the same location in both of the masked images; and
a position identifier state configured to determine the three-dimensional position of the object using the set of common pixels.

15. The object tracking system of claim 14, wherein the search state is implemented in a machine learning model trained to detect aerial vehicles in images.

16. The object tracking system of claim 12, wherein the object tracker is configured to:
predict a subsequent three-dimensional position of the object using the three-dimensional position of the object and a set of prior three-dimensional positions of the object.

17. The object tracking system of claim 16, wherein in predicting the subsequent three-dimensional position of the object using the three-dimensional position of the object and the set of prior three-dimensional positions of the object, the object tracker is configured to:
perform filtering to predict the subsequent three-dimensional position and a velocity of the object using the three-dimensional position of the object and the set of prior three-dimensional positions of the object.

18. The object tracking system of claim 16, wherein the object tracker is configured to:
receive a subsequent image pair;
determine the region of interest in the subsequent image pair based on a prior region of interest and a predicted subsequent three-dimensional position of the object in the subsequent image pair;
apply the mask based on the region of interest to the subsequent image pair, wherein the mask masks out the portions of the subsequent image pair outside of the region of interest to form subsequent masked images;
perform the intensity averaging on the subsequent masked images to detect the set of pixels having the greatest intensity in the subsequent masked images, wherein the set of pixels in the subsequent masked images is the set of common pixels in the subsequent masked images that is are assumed to have the same location; and determine the three-dimensional position of the object using the set of common pixels identified in the subsequent masked images.

19. The object tracking system of claim 18, wherein the object tracker is configured to:
   illuminate the target with a laser beam such that the object is illuminated by the laser beam in the image pair; and
   direct the laser beam to continue to illuminate the object with the laser beam using the predicted subsequent three-dimensional position of the object.

20. The object tracking system of claim 12, wherein in determining the three-dimensional position of the object using the set of common pixels, the object tracker is configured to:
   determining a position of the object in a camera coordinate frame using a triangulation performed on the set of common pixels in the masked images; and
   convert the position of the object from the camera coordinate frame to a global coordinate frame to obtain the three-dimensional position of the object.

21. The object tracking system of claim 12, wherein in determining the region of interest in the image pair based on the bounding box for the object in the image pair, the object tracker is configured to:
   identify motion inputs; and
   determine the region of interest in the image pair based on the bounding box for the object in the image pair and the motion inputs.

22. The object tracking system of claim 12, wherein the intensity averaging is selected from at least one of a weighted intensity averaging, a maximum pixel value, or a sliding window average.

23. The object tracking system of claim 12, wherein the region of interest is selected to include the bounding box, be located in the bounding box, or overlap a portion of the bounding box.

24. The object tracking system of claim 12, wherein the three-dimensional position of the object comprises a location of the object in three-dimensional space and an orientation of the object.

25. A computer program product for tracking an object, the computer program product comprising:
   a computer-readable storage media;
   first program code, stored on the computer-readable storage media, executable by a computer system to cause the computer system to determine a region of interest in stereoscopic images based on a bounding box determined for the object in the stereoscopic images;
   second program code, stored on the computer-readable storage media, executable by the computer system to cause the computer system to apply a mask based on the region of interest to the stereoscopic images, wherein the mask masks out portions of the stereoscopic images outside of the region of interest to form masked images;
   third program code, stored on the computer-readable storage media, executable by the computer system to cause the computer system to perform intensity averaging on the masked images to detect a set of pixels having a greatest intensity in the masked images, wherein the set of pixels in the masked images is a set of common pixels in the masked images in which the set of common pixels is assumed to have a same location in both of the masked images; and
   fourth program code, stored on the computer-readable storage media, executable by the computer system to cause the computer system to determine a three-dimensional position of the object using the set of common pixels.

* * * * *